June 15, 1937. W. G. FITZ GERALD 2,083,903
TIRE CHAIN
Filed April 27, 1936 2 Sheets-Sheet 1
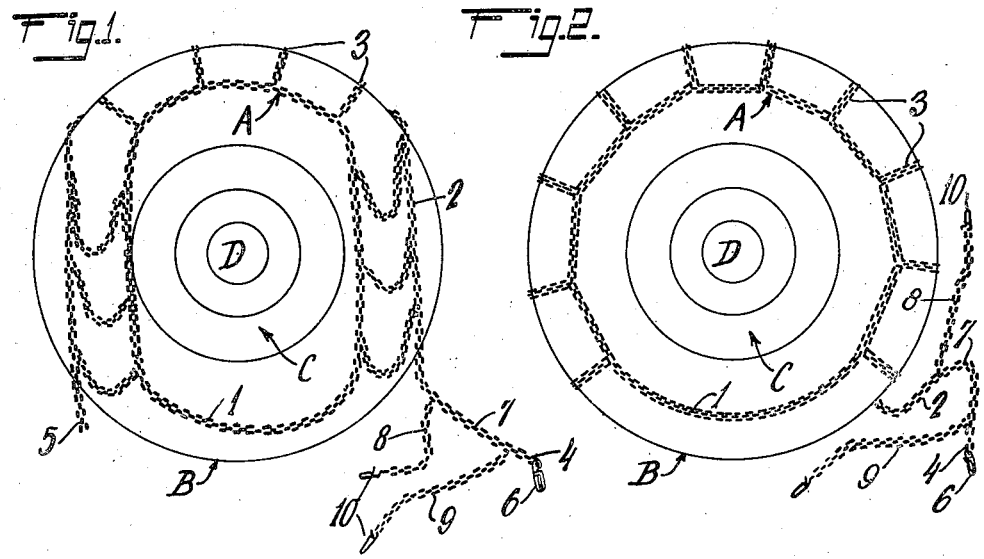
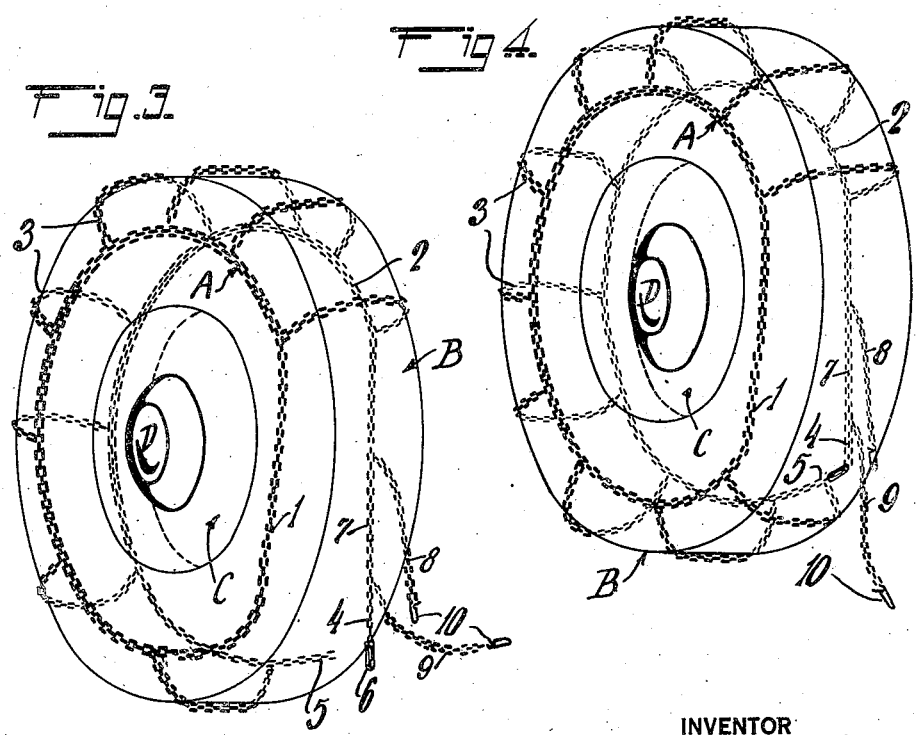
INVENTOR
William G. FitzGerald
BY
Robert Irving Williams
ATTORNEY

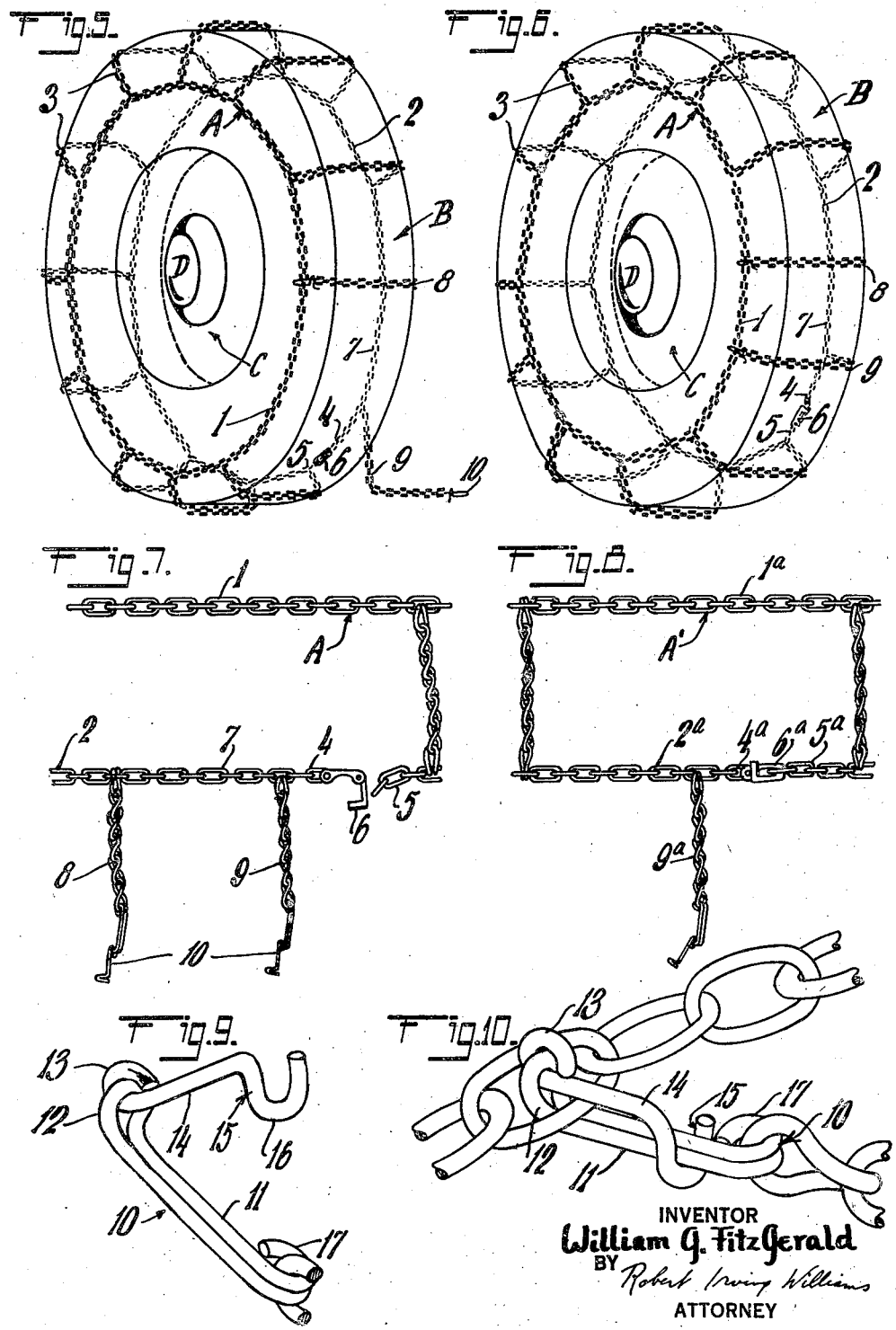

Patented June 15, 1937

2,083,903

UNITED STATES PATENT OFFICE 2,083,903

TIRE CHAIN

William G. Fitz Gerald, Tarrytown, N. Y.

Application April 27, 1936, Serial No. 76,516

6 Claims. (Cl. 152—14)

This invention relates to tire chains.

An object of the invention is the provision of an improved tire chain which is of sturdy and effective construction but yet may be applied to a tire with a minimum of effort.

A further object is the provision of an improved tire chain, the attaching means of which are all readily manipulatable while the chain is being applied to a tire.

Another object is the provision of an easily operable attaching means for a cross chain of a tire chain, which means will hold firmly when applied.

Other objects of the invention will in part be obvious and will in part appear hereinafter.

The invention accordingly comprises the features of construction, combinations of elements and arrangement of parts, all of which will be exemplified hereinafter and the scope of the application of which will be indicated in the claims.

For a fuller understanding of the nature and objects of the invention reference should be had to the following detailed description taken in connection with the accompanying drawings, in which:

Fig. 1 is a side elevation of a chain embodying the invention in the first state of application to a tire;

Fig. 2 is a similar view showing a further stage in the application of the chain;

Fig. 3 is a perspective view on a slightly enlarged scale showing a still further stage;

Fig. 4 is a similar view showing a later stage in the application of the chain;

Fig. 5 is a similar view showing a still later stage;

Fig. 6 is a similar view showing the chain completely secured on the tire;

Fig. 7 is a view on an enlarged scale showing certain details of the chain of Figs. 1–6;

Fig. 8 is a similar view illustrating a modification;

Fig. 9 is a perspective view showing the catch for the end of a cross chain on a much larger scale; and Fig. 10 is a similar view taken from a different angle and showing the catch of Fig. 9 in place.

The tire chains now in common use are generally effective when applied to a tire, but have numerous disadvantages in the application of them to the tire. Probably the most common method now employed for applying the ordinary type of chain to a tire is to lay it out on the ground behind the wheel, run the wheel backward or forward onto it, then drape it over the tire and join its ends in the restricted space between the tire and fender of the car. Quite often this must be done under cold or stormy conditions and on muddy or slushy ground. As a result the chain is muddy or wet, which adds to the inconvenience inherent in the application of the usual type of chain. This inconvenience is considerable, at best, since the chain must be draped over the tire after it has lain on the ground, and the cross chains must be worked over the rim of the tire so as to permit the ends of the inner side chain to come together. This is made more difficult by the fact that it is almost impossible to roll the tire over the chain without having the side chain misaligned, and by the fact that the ends of the side chains are held together by the cross chains. With both side chains open, considerable ingenuity is required to properly position the portion of the chain which is lifted from the ground and draped over the tire, whereas, when the outer cross chain is fastened first, it is a matter of extreme difficulty to overcome the tautness of the chain portions so as to fasten the inner side chain, which must be fastened by reaching inside behind the tire thru the space between the tire and the fender where considerable groping around is required and even a small degree of tautness adds greatly to the difficulty. Furthermore there is plenty of opportunity for cutting or injuring the fingers due to the fact that very little slack is present to allow for manipulation. Even if the ground and tire are dry, there is plenty of chance for soiling the hands and coat-sleeves due to accumulation of dirt on the underneath part of the car and on the tire. Should the ground and tire be wet, this condition is aggravated considerably.

Another common manner of applying the conventional tire chain is to jack up the rear of the car, drape the chain over the tire and fasten the catches at the ends of the side chains in the manner already indicated. This, however, is usually only resorted to when it can be carried out by a garage attendant with a large jack since jacking up the wheels individually is commonly considered more nuisance than it is worth. In following this system, it is still necessary, as already pointed out, to fasten the catch on the inner side chain behind the wheel where there is insufficient slack for easy manipulation. Any later adjusting or tightening of the chain requires repetition of the same procedure of groping behind the tire. The catch on the outer side chain in both manners of application of the conventional chain is more readily engaged and closed, but nevertheless adds considerably to the annoyance of putting on a chain, particularly if the weather is cold or otherwise unfavorable.

With the foregoing and other difficulties in view, the present invention contemplates the provision of a tire chain which is just as effective when applied as are those at present in common use, but which may be applied by the ordinary automobile user with much greater ease. It further contemplates the provision of improved methods for equipping a tire with a chain and particularly for the application of a chain.

In accordance with the invention there may be provided a tire chain having a continuous outer side chain, an interrupted inner side chain, and one or more cross chains carried by the inner side chain adjacent its point of interruption and detachably fastenable to the outer side chain. It is to be particularly observed in this connection that the invention in certain of its broader aspects includes a tire chain wherein the continuity of the outer side chain may be broken when necessary, and likewise includes the provision of either a single detachable cross chain or a plurality of detachable cross chains suitably arranged at either or both sides of the point of interruption of the inner side chain. One may apply such a chain to a tire by draping it over the tire rather than by laying it out on the ground. The automobile or other vehicle may then be moved slightly to get the end of the chain carrying the ordinary cross links underneath the wheel. Alternatively the wheel may be moved upwardly by jacking, after the chain has been draped thereon. This alternative is suitable when the proper facilities are at hand. The upper free end of the inner side chain, which will be dry and clean, and will be hanging loose, straight down, and with plenty of slack in it, may then be very easily attached to the lower end of said side chain by grasping both ends and engaging them. This operation may be performed in a position in which the ends can be easily seen and manipulated. The final stage is to bring the detachable cross chain or chains across the periphery of the tire from the inner side chain, to which they are permanently attached, and engage them to the continuous outer side chain. This last step takes up the slack remaining in the interrupted inner side chain, and does so by a manipulation on the outer face of the tire rather than in the restricted space behind the tire as is necessary in adjusting the end engaging means in prior constructions.

Further in accordance with the invention there may be provided an improved type of fastening means for the detachable ends of the cross chains whereby there may be secured with particular ease and with a high degree of effectiveness.

By way of example there is illustrated at A in Figs. 1 thru 7 one form of tire chain embodying the invention. In Figs. 1 thru 6, the chain is shown in various stages of its application to a conventional type of tire which is shown diagrammatically at B as carried on a wheel C of the conventional type having at its outer side a hub cap D. The chain A comprises side chains 1 and 2 connected thruout the greater part of their extent by conventional cross chains 3. The side chain 1, which is adapted to be disposed at the outer side of the tire, is continuous,—i. e.—adapted to be applied as a complete ring instead of in interrupted form as in the usual practice.

The inner side chain 2 is of the conventional interrupted type having ends 4 and 5 adapted to be fastened together by conventional fastening means 6. A portion 7 of the inner side chain adjacent to the end 4 which, in the present instance, is the upper end,—the one which usually hangs loose from the top of the tire—carries, instead of the conventional cross chains, cross chains 8 and 9 which are adapted to be detachably secured to the outer chain 1, as by means such as hereinafter exemplified, or by other suitable means. The various chains, as exemplified, are composed thruout of conventional links except as otherwise indicated.

As above indicated the detachable cross chain or chains such as 8 and 9, may be carried on either end of the interrupted chain 2, or on both, if desired, without departing from the invention in its broader aspects. Nevertheless it is ordinarily advantageous in applying the chain to have the detachable cross chain or chains on the upper portion of the interrupted chain; due to the fact that were the detachable chains adjacent the lower end they would have to be lifted along with said lower end, whereas on the upper portion their weight would be carried by the chain itself. By merely turning the chain inside out and draping it on the tire in its reversed condition, cross chains 8 and 9 can be located towards either the front or rear of the car. This reversability permits a chain to fit a wheel on either side of the car and permits application of chains to both rear wheels by rotation of both wheels in the same direction.

At the free end of each of the cross chains 8 and 9 there may be provided, in accordance with the invention, locking means 10 for engagement with the continuous side chain 1. The details of the illustrative embodiment of this locking means are shown in Figs. 9 and 10, wherein a chain section or the like is bent back on itself to form a base 11 and a laterally-extending loop portion 12. Pivotally engaged with the loop portion 12 is loop end 13 of a catch member 14. The opposite end of the member 14 is offset sideways into a return bent portion which forms a hook 15 adapted to hook under the base 11 or an adjacent link of cross chain 8. The end link of said cross chain is retained by a loop 17 at the end of base member 11 remote from the pivot portion 12. In applying the locking means, the portions 15, 14, and 12 are preferably slipped thru a link of the chain 1 as indicated in Fig. 10 and the hook 15 swung under the cross chain, preferably, as shown, under the portion thereof provided by the base member. Member 14 may, however, entirely encompass the link of the chain 1, if desired, and the hook 15 may fit under the body of the cross chain rather than the base member 11. When the hook 15 fits under the base 11 or the adjacent cross chain 4, its base 16 will generally engage the side wall of the tire on which the chain is mounted. This will act as additional means for retaining the locking member closed. It is not essential, however, that the hook be so held, if the portion 12 passes thru a link, since the portions 14 and 12 will ordinarily hold the cross chain in place.

Fig. 8 shows a slightly modified form of chain A' which embodies the invention and in which only one detachable cross chain 8a is provided. In this figure the parts corresponding to those of Figs. 1–7 are designated by similar reference numerals with the subscript a. The use of a single detachable cross chain as shown provides sufficient slack to markedly facilitate the manipulation of the inner side chain, tho not as much as is the case where two detachable cross chains are used. In Fig. 8, the catch 6a engaging the end 5a of chain 2a is shown as closed. The form of this catch, which is the same as that shown in the other figures, is conventional and forms no part of the present invention.

In the preferred manner of forming of a chain embodying the invention, the outer side chain is made continuous or in a complete ring, instead of being interrupted and having means for detachably fastening its ends at the interruption as in common practice. Only the inner side chain is interrupted. One or more of the cross chains adjacent the interrupted portion of the side chain are permanently attached only to the inner side chain as shown in the drawings. Their other ends are provided with locking means for detachably engaging the continuous side chain. Thus, a chain is formed in a new way.

Relating the preferred manner in which this chain is applied to a tire will also serve as a summation of the invention. The chain is initially draped on the tire, as shown in Fig. 1,—with one or the other face of the cross chains 3 against the tire, depending on the direction in which the wheel is to be moved—and is seated evenly around the periphery, as shown in Fig. 2; next the wheel is moved slightly so that one or more of the cross chains 3 adjacent loose end 5 will be projected underneath the wheel. Now end 5 and fastening means 6 will be hanging loose and easily accessible. This is particularly true of means 6, being as it is at the end of freely hanging portion 7. Due to this looseness the engagement of end 5 with member 6 can be carried out while they are held in a position where they can be seen and easily handled. Next, cross chains 8 and 9 can be laid over the periphery of the tire and members 10 engaged with side chain 1. It makes relatively little difference which one of cross chains 8 and 9 is set in place first, altho it is often desirable to fasten the upper one first, as it is somewhat less easily accessible. Also there may be only one cross chain to engage as in the form of Fig. 8.

Since certain changes in the construction set forth and different embodiments of the invention may be made without departing from the scope of the invention, it is intended that all matter contained in the above description or shown in the accompanying drawings shall be interpreted as illustrative and not in a limiting sense.

The invention claimed is:

1. A tire chain comprising side chains and cross chains, one of said side chains being continuous, and at least one of said cross chains being detachably engageable with one of said side chains to take up slack in said side chains.

2. A tire chain comprising side chains and cross chains, said side chains being composed of short links thruout, one of said side chains being interrupted at a single point, means for engaging the ends of said interrupted chain, and means for detachably engaging at least one of the cross chains with one of said side chains, the last mentioned of said cross chains being adjacent to the point of interruption so that slack present adjacent to this point for facilitating the engagement of the ends of the interrupted chain may be taken up.

3. A tire chain comprising two side chains, one of which is interrupted at a point in its length, connecting means for the ends of said interrupted side chain, and a series of cross chains for connecting said side chains, a plurality of said cross chains having means for removably connecting one of their ends to one of said side chains, whereby slack in the side chains may be taken up.

4. A tire chain comprising a fully flexible outer side chain, a fully flexible inner side chain having means for joining the ends thereof, and a series of cross chains for connecting said side chains, at least one of the cross chains adjacent the ends of the inner side chain having means for detachable engagement with said outer side chain, whereby the ends of the inner side chain may be joined while slack remains therein and slack therein may be taken up after its ends are joined.

5. A tire chain comprising two side chains, one being continuous and the other interrupted at a point in its length, means for interconnecting the ends of said interrupted chain, cross chains for connecting said side chains, at least one of said cross chains secured to said interrupted side chain and adjacent said connecting means having means for removably connecting its free end to said continuous side chain for taking up slack.

6. A tire chain comprising side chains and cross chains, one of said side chains being interrupted at a single point, means for engaging the ends of said interrupted chain, and means for detachably engaging with the other of said side chains at least one of the cross chains which is secured to said interrupted chain adjacent to the point of interruption, the last mentioned means including a bent portion adapted to extend under a part of the side chain and outwardly beyond said part and a portion pivoted to the outward end of the first mentioned portion and extending rearwardly therefrom and adapted to extend under a cross-chain portion.

WILLIAM G. FITZ GERALD.